United States Patent Office 3,833,567
Patented Sept. 3, 1974

---

3,833,567
PHENOTHIAZINES
Edgar Eriksoo, Hans Jacob Fex, and Knut Bertil Hogberg, Halsingborg, Henri Rene Mollberg, Paarp, Oskar Adolf Rohte, Raa, and Paul Hans Otto Josef Kneip, deceased, late of Halsingborg, Sweden, by Ruth Kneip, Lund, Sweden, legal representative, assignors to Aktiebolaget Lee, Halsingborg, Sweden
No Drawing. Continuation-in-part of application Ser. No. 719,665, Apr. 8, 1968, now Patent No. 3,637,660. This application Oct. 1, 1971, Ser. No. 185,879
Int. Cl. C07d 93/14
U.S. Cl. 260—243 A      6 Claims

ABSTRACT OF THE DISCLOSURE

Benzoylalkylaminoalkylphenothiazine derivatives of therapeutic interest, compositions containing such derivatives, and method of treating with such compositions, are disclosed. These compounds have para-sympatholytic, sympathomimetic and sedative activity useful in the treatment of central nervous system disorders, especially endogenic depressions.

CROSS-REFERENCE TO RELATED APPLICATIONS

This application is a continuation-in-part of copending application U.S. Ser. No. 719,665, filed on Apr. 8, 1968, now U.S. Pat. No. 3,637,660.

SUMMARY OF THE INVENTION

The present invention concerns a group of new heterocyclic aminoketones having valuable pharmacological properties, compositions thereof, and method of treating therewith.

The new compounds of the present invention are benzoylalkylaminoalkylphenothiazine derivatives which correspond to the general formula (I):

[Structure: phenothiazine with $-R^3$ substituent and N-substituent $CH_2CHCH_2N-(CH_2)_nCOR^2$ with $R^1$ and $CH_3$ groups]   (I)

wherein $R^1$ represents H or $CH_3$;
$n$ is 1, 2 or 3 ($n=1$ is preferred);
$R^2$ represents a phenyl group, optionally substituted with one to three, alike or different, substituents selected from the group consisting of F, Cl, OH, or $CF_3$, as well as an alkyl or an alkoxy group containing 1 to 4 carbon atoms, inclusive; or a phenyl group substituted at the 3,4-positions with an alkylidenedioxy (containing up to 6 carbon atoms, inclusive) group; and $R^3$ represents H, F, Cl, $OCH_3$, $CF_3$ or $SO_2N(CH_3)_2$.

Pharamecutically acceptable acid addition salts of the foregoing compounds are also contemplated.

It has been found that the compounds of this invention are pharmacologically active, especially with regard to the central nervous system. They potentiate apomorphine and have para-sympatholytic and sypathomimetic activity. They also antagonize the effects of reserpine. The compounds of formula (I) have, in addition, a sedative activity. As the compounds of the invention also show a surprisingly low toxicity, they may be used therapeutically in disorders related to the central nervous system, especially in depressions.

Although formula (I) comprises compounds of a relativity wide spectrum of pharmacological properties, which vary depending on the position and nature of the individual substituents, it seems to be a common character of them that they are all active on the central nervous system and exhibit a remarkably low toxicity.

This low toxicity is of particular importance considering the high occurrence of suicides committed with antidepressive agents.

A particularly preferred and advantageous compound is N - methyl-N-(4-chlorobenzoylmethyl)-3-(phenothiazin 10-yl)-propylamine. The provision of such novel and valuable compounds, compositions thereof, and a method of treating therewith are among the objects of the present invention. Additional objects will become apparent hereinafter and still other objects will be recognized by one skilled in the art.

DETAILED DESCRIPTION OF THE PREFERRED EMBODIMENT

The compounds of the general formula (I) can be considered to be built up from the following four components, namely

[Structure: phenothiazine $-R^3$] + $HOCH_2CHCH_2OH$ + $CH_3NH_2$ + $R^1$ $HO(CH_2)_nCOR^2$ (II)     (III)     (IV)     (V)

the symbols $R^1$, $R^2$, $R^3$ and $n$ as usd in these formulas and in the following description being defined as above, and can be produced by a series of reactions in which the amines (III) and (IV) are treated with reactive esters of the alcohols (III) and (V). The order between the components of the molecule is determined by the structure of the compounds as shown in the general formula (I). The bonds between the components can, however, be established in optional order, as indicated below.

From a general point of view, the compounds can therefore be prepared by reacting the amines of the formulas (II) and (IV) stepwise with reactive esters of the alcohols of the formulas (III) and (V), the steps being chosen so that the components will be condensed to form successively the compound of the formula (I), which may, if desired, be transferred into a pharmaceutically acceptable addition salt. The reaction may be carried out in an inert solvent, and the amine of the formula (II) may be used in the form of a salt of an alkali metal, preferably lithium or sodium.

The carbonyl group of the alcohol $HO(CH_2)nCOR^2$, or of any intermediate derived therefrom, is preferably or, when required, reversibly protected, in a manner known per se, preferably as a ketal of a mono- or difunctional alcohol.

According to a first embodiment of this process an amine with the general formula (II),

[Structure: phenothiazine with $-R_3$ substituent, NH]    (II)

is treated with a reactive ester of an alcohol of the general formula $HOCH_2CHCH_2N(CH_2)_nCOR^2$
$R^1$    $CH_3$        (VI)

in the presence of an acid binding agent such as sodium amide. The reaction is preferably carried out in an inert organic solvent, such as benzene, toluene, xylene, or dioxane, by heating at a temperature between 50° C. and the boiling point of the reaction mixture.

As reactive esters of the alcohol of the general formula (VI) particularly the esters of hydrohalogenic acids (HCl, HBr or HI) and aromatic or aliphatic sulphonic acids come into consideration.

In a second variation of the general process a secondary amine of the general formula

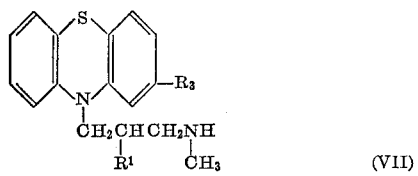

(VII)

is treated with a reactive ester of the alcohol of the general formula $$HO(CH_2)_nCOR^2 \quad (V)$$

wherein $R^2$ and $n$ are defined as above. As reactive esters of the alcohol (V) those of hydrochloric and hydrobromic acids are particularly suitable. The reaction is carried out in the presence of an acid binding agent, such as a hydroxide, carbonate or hydrogencarbonate of an alkali or alkaline earth metal, or in the presence of an excess of the secondary amine of formula (VII). The reaction can be carried out in various solvents, such as hydrocarbons, esters, ketones, or in mixtures of such a solvent with water, at a temperature from 0° C. to the boiling point of the reaction mixture.

According to a third embodiment of the process compounds of the general formula (I) can be obtained by treating an aminoketone of the general formula,

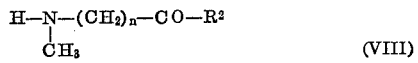

(VIII)

with a reactive ester of an alcohol of the general formula

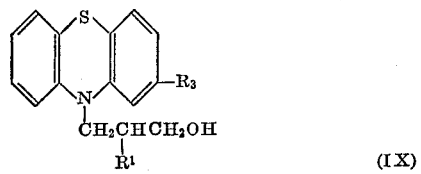

(IX)

such as esters of hydrohalogenic acids or of aromatic or aliphatic sulphonic acids as commonly used in the art.

The reaction is preferably carried out in a solvent medium at a temperature from about 50° C. to the boiling point of the reaction mixture, with or without an acid binding agent, such as an alkali hydroxide, amide, carbonate or hydrogencarbonate. Instead of an acid binding agent an excess of the amine component may be used in the process.

For therapeutic purposes the bases of the general formula (I) may be employed as such or in the form of acid addition salts containing anions which are pharmaceutically acceptable, such as hydrochlorides, hydrobromides, phosphates, nitrates, sulphates, hydrogenoxalates, oxalates, succinates, tartrates, methanesulphonates ethanedisulfonates so that the beneficial physiological properties are not vitiated by side-effects ascribable to the anions. For some purposes they may be used in the form of quaternary ammonium salts obtained by reaction with organic halides or other reactive organic esters (e.g. methyl or ethyl iodide, chloride, or bromide, or alkyl or benzyl chloride or bromide, methyl or ethyl sulphate or benzensulphonate).

The following examples are intended to illustrate the present invention but not to limit the scope thereof.

EXAMPLE 1

15.2 Parts of 3-methylaminopropanol are dissolved in 50 parts of benzene and 11.3 parts of ω-chloroacetophenone are added, followed by a solution of 5.2 parts of potassium hydroxide in 50 parts of water. After refluxing for four hours, the reaction mixture is cooled to room temperature and the aqueous phase is discarded. The benzene solution is evaporated to dryness in vacuo. The residue contains N - methyl-N-benzoylmethyl-3-aminopropanol-1. It can be purified by crystallization as the hydrogen oxalate. M.p. 162° C. (from butanone).

17.3 Parts of N-methyl-N-benzoylmethyl-3-aminopropanol-1 are dissolved in 50 parts by volume of dry chloroform. A solution of 10.9 parts of thionyl choride in 50 parts by volume of dry chloroform is added during a time period of one hour, while stirring, at room temperature. The solution is then refluxed for three hours and evaporated to dryness in vacuo. The residue is dissolved in ethanol. Upon careful adding of ether and cooling the hydrochloride of N-methyl-N-(3-chloropropyl)-benzoylmethyl-amine separates and is filtered off. M.p. 139–140° C.

11.7 Parts of 2-chlorophenothiazine are dissolved in 10 parts of dry toluene and 3.1 parts of sodium amide are added and the mixture is refluxed and stirred for four hours. A solution of 13.5 parts of N-methyl-N-(3-chloropropyl)-benzoylmethyl-amine in 20 parts of dry toluene is added dropwise and the mixture is stirred and refluxed for eight hours.

After cooling to room temperature, water is carefully added to the reaction mixture and the toluene solution is extracted with water to which hydrochloric acid is added so that the aqueous phase obtains the pH-value of 5. The aqueous extract is discarded and the toluene phase is evaporated to dryness in vacuo. The residue is dissolved in 30 parts of methanol and a solution of 1.8 parts of hydrogen chloride in 60 parts of butanone is added. After cooling N-methyl-N-benzoylmethyl-3-(2-chlorophenothiazin-10-yl)-propylamine hydrogen chloride crystallizes and is filtered off. M.p. 182–183° C.

EXAMPLE 2

19.5 Parts of 2-bromomethyl-2-phenyl-1,3-dioxolane are added to a solution of 56 parts of methylamine in 150 parts of methanol and heated in an autoclave to 160° C. for 16 hours. After cooling the reaction mixture is poured into water and extracted with ether. The ethereal extract is dried, evaporated to dryness and the residue is dissolved in ethanol. Hydrogen chloride is introduced. The hydrochloride of 2-methylaminomethyl-2-phenyl-1,3-dioxolane separates as a crystalline precipitate and is filtered off. M.p. 230° C.

2.5 Parts of 2-methylaminomethyl-2-phenyl-1,3-dioxolane are dissolved in 25 parts of acetonitrile and 3.8 parts of 2-chloro-10-(3-chloropropyl) - phenothiazine are added and the reaction mixture is refluxed for four hours. After cooling to room temperature 1.35 parts of hydrogen chloride in 10 parts of water are added. The solution is left at room temperature for 16 hours and then poured into a solution of 10 parts of potassium carbonate in water. The resulting mixture is extracted with ether. The ethereal extract is evaporated to dryness in vacuo. The residue is dissolved in butanone and a solution of oxalic acid in butanone is added. After cooling crystals of the hydrogen oxalate of N-methyl-N-benzoylmethyl-3-(2-chlorophenothiazin-10-yl)-propylamine (M.p. 182–183° C.) are obtained.

EXAMPLE 3

10.5 Parts of 2,N-dimethyl - 3 - (2-methoxyphenothiazine-10-yl)-propyl-amine and 6.2 parts of ω-chloroacetophenone are dissolved in 60 parts of benzene and a solution of 3.8 parts of potassium hydroxide in 15 parts of water is added. The reaction mixture is refluxed for three hours. The aqueous phase is separated and discarded. The benzene solution is evaporated to dryness in vacuo and the residue is dissolved in ether. Hydrogen chloride gas is introduced to give the crystalline hydrochloride of N-benzoylmethyl-2,N-dimethyl - 3 - (2-methoxyphenothiazin-10-yl)-propylamine. M.p. 145–150° C.

In the same manner as in the example above the following compounds are prepared.

N-methyl-N-(4-ethoxybenzoylmethyl)-2-methyl-3-(2-methoxyphenothiazin-10-yl)-propylamine hydrochloride. M.p. 213–215° C.
N-methyl-(4-n-butoxybenzoylmethyl)-2-methyl-3-(2-methoxyphenothiazin-10-yl)-propylamine hydrogen oxalate. M.p. 162–164° C.
2,N-dimethyl-N-(3,4-dimethoxybenzoylmethyl)-3-(2-methoxyphenothiazin-10-yl)-propylamine hydrogen oxalate. M.p. 160–162° C.
2,N-dimethyl-N-(3,4,5-trimethoxy-benzoylmethyl)-3-(2-methoxyphenothiazin-10-yl)-propylamine hydrogen oxalate. M.p. 180–182° C.
N-methyl-N-(4-methoxybenzoylmethyl)-3-(2-chlorophenothiazin-10-yl)-propylamine hydrochloride. M.p. 174–175.5° C.
N-methyl-N-(4-chlorobenzoylmethyl)-3-(2-chlorophenothiazin-10-yl)-propylamine hydrochloride. M.p. 182–183° C.
2,N-dimethyl-N-(4-isopropoxybenzoylmethyl)-3-(2-methoxyphenothiazin-10-yl)-propylamine hydrochloride. M.p. 193–195° C.
N-methyl-N-(4-chlorobenzoylmethyl)-3-(2-methoxyphenothiazin-10-yl)-propylamine hydrogen oxalate. M.p. 159–160° C.
N-methyl-N-(4-methoxybenzoylmethyl)-3-(2-methoxyphenothiazin-10-yl)-propylamine hydrogen oxalate. M.p. 167–169° C.
N-methyl-N-(4-chlorobenzoylmethyl)-3-(phenothiazin-10-yl)-propylamine hydrogen oxalate. M.p. 189–191° C.
N-methyl-N-(4-methoxybenzoylmethyl)-3-(phenothiazin-10-yl)-propylamine hydrogen oxalate. M.p. 182–183° C.
N-methyl-N-(4-methoxybenzoylmethyl)-3-(2-trifluoromethylphenothiazin-10-yl)-propylamine hydrogen oxalate. M.p. 185–187° C.
2,N-dimethyl-N-(4-chlorobenzoylmethyl)-3-(2-methoxyphenothiazin-10-yl)-propylamine hydrogen oxalate. M.p. 135° C.
2,N-dimethyl-N-(3,4-methylendioxybenzoylmethyl)-3-(2-methoxyphenothiazin-10-yl)-propylamine hydrogen oxalate. M.p. 159–160° C.
N-methyl-N-(3,4-methylendioxybenzoylmethyl)-3,(2-trifluoro-methylphenothiazin-10-yl)-propylamine hydrogen oxalate. M.p. 183° C.
N-methyl-N-(3,4-methylendioxybenzoylmethyl)-3-phenothiazin-10-yl)-propylamine hydrogen oxalate. M.p. 172–175° C.
N-methyl-N-(3,4-methylendioxybenzoylmethyl)-3-(2-methoxyphenothiazin-10-yl)-propylamine hydrogen oxalate. M.p. 148–149° C.
2,N-dimethyl-N-(3,4-ethylenedioxybenzoylmethyl)-3-(2-methoxyphenothiazin-10-yl)-propylamine hydrochloride. M.p. 178–18° C. (decomp.).

EXAMPLE 4

16.3 Parts of N-methyl-3-(2-chlorophenothiazin-10-yl)-propylamine are dissolved in 140 parts of dry acetone, and 16.7 parts of calcium carbonate are added. The mixture is cooled in ice and while stirring a solution of 28.4 parts of 2-chloropropiophenone is added dropwise during one hour. The stirring is then continued for four hours at room temperature. 5.5 Parts of acetic anhydride are then added and the reaction mixture is left overnight at room temperature. The reaction mixture is then filtered. The residue is extracted with 50 parts of warm methanol and the extract is combined with the filtrate. Then 200 parts of water are added and potassium carbonate to pH=9. The mixture is extracted with ether. The extract is dired and evaporated to dryness in vacuo. The residue is then dissolved in methanol and solution of hydrogen chloride in ether is added. After cooling N-methyl-N-(2-benzoylethyl) - 3 - (2-chlorophenothiazin-10-yl)-propylamine hydrochloride crystallizes and is filtered off. M.p. 154–156° C.

EXAMPLE 5

15.3 Parts of N-methyl - 3 - (phenothiazin-10-yl)-propylamine are dissolved in 140 parts of dry toluene. 12.2 parts of 4-chlorobutyrophenone and 0.28 parts of potassium iodide are added. The reaction mixture is refluxed for 16 hours and after cooling extracted with water. The extract is discarded. The toluene solution is then evaporated to dryness. The residue is dissolved in 50 parts of acetone and 17 parts of acetic anhydride are added. The reaction mixture is left for 24 hours at room temperature and then poured into ice-water. Potassium carbonate is added to pH=9 and the mixture is extracted with ether. The ether extract is evaporated to dryness N-methyl-N-(3-benzoylpropyl) - 3 - (phenothiazin-10-yl)-propylamine is so obtained as an oil, M.p. 149–150° C.

EXAMPLE 6

11.5 Parts of N-methyl - 3 - (2 - trifluoromethylphenothiazin - 10 - yl)-propylamine and 7.1 parts of 4-chlorophenacylbromide dissolved in 100 parts of benzene and a solution of 3 parts of sodium-hydrogencarbonate in 30 parts of water are added. The reaction mixture is stirred for three hours at room temperature. The aqueous phase is separated and discarded. The organic phase is extracted with an aqueous solution of hydrochloric acid until pH=3.2 was obtained. The organic phase is then dried over anhydrous sodium sulphate, and poured into a solution of an equimolar amount of oxalic acid in butanone. The hydrogen oxalate of N-methyl-N-(4-chlorobenzoylmethyl) - 3 - (2 - trifluoromethylphenothiazin-10-yl)-propylamine crystallizes and is filtered off. M.p. 189–191° C.

In the same manner as in the Example above the following compounds are prepared:

N-methyl-N-(4 - hydroxybenoxylmethyl)-3-(phenothiazin-10-yl)-propuylamine from N methyl - 3 - (phenothiazin-10-yl)-propylamine and ω-chloro - 4 - hydroxyacetophenone.
N-methyl-N-(3-ethylbenzoylmethyl) - 3 - (2-chlorophenothiazin-10-yl)-propylamine from N-methyl-3-(2-chlorophenothiazin-10-yl)-propylamine and ω-chloro-3-ethylacetophenone.
N-methyl - N - [3,4-(2-butyliden)-dioxybenzoylmethyl]-3-(2-trifluoromethylphenothiazin - 10 - yl)-propylamine from N-methyl - 3 - (2-trifluoromethylphenothiazin-10-yl)-propylamine and 10-chloro-3,4-(2-butyliden)-dioxyacetophenone.
N-methyl-N-(3 - fluorobenzoylmethyl) - 3 - (2-dimethylsulphamoylphenothiazin - 10 - yl)-propylamine from N-methyl - 3 - (2-dimethylsulphamolyphenothiazin-10-yl)-propylamine and ω-chloro - 3 - fluoroacetophenone.
N-methyl-N-(4 - trifluoromethylbenzoylmethyl) - 3 - (2-methoxyphenothiazin - 10 - yl)-propylamine from N-methyl - 3 - (2-methoxyphenothiazin - 10 - yl)-propylamine and ω-bromo-4-trifluoromethylacetophenone.
N-methyl-N-(4 - chloro-benzoylmethyl) - 3 - (2 - fluorophenothiazin - 10 - yl)-propylamine from N-methyl-3-(2 - fluorophenothiazin - 10 - yl)-propylamine and ω-bromo-4-chloroacetophenone.

The following examples of compositions containing the compounds of this invention are given by way of illustration only and are not to be construed as limiting.

EXAMPLE 7

10,000 tablets of 50 mq. each

| | G. |
|---|---|
| N-methyl-N-(4 - chlorobenzoylmethyl) - 3 - phenothiazin-10-yl)-propylamine hydrochloride | 500 |
| Lactose | 1600 |
| Starch | 560 |
| Polyvinylpyrrolidone | 25 |
| Magnesiumstearate | 15 |
| Talc | 150 |
| Water, q.s. | |

The N-methyl-N-(4 - chlorobenzoylmethyl) - 3 - phenothiazin - 10 - yl)-propylamine hydrochloride, lactose and starch are mixed together and screened. The polyvinyl pyrrolidone is dissolved in a suitable amount of water and added to said mixture, which is then granulated. The granulated obtained is then dried and mixed with the magnesiumstearate and the talc, whereafter tablets are made.

EXAMPLE 8

Aqueous suspension for injection

| | Mg. |
|---|---|
| 2,N-dimethyl - N - benzoylmethyl - 3 - (2-methoxyphenothiazin-10-yl)propylamine hydrochloride | 250 |
| Methylcellulose | 15 |
| Polyoxyethylenesorbitan, monostearate (Tween [1]) | 20 |
| Distilled water to make 5 ml. | |

[1] Trademark of Atlas Powder Company.

Where the foregoing Examples produce a compound having a methyl or other lower-alkyl group, it is to be understood that compounds containing other lower-alkyl groups of straight or branched nature and containing up to four carbon atoms inclusive, such as methyl, ethyl, propyl, isopropyl, butyl, sec.-butyl, or t.-butyl are prepared in the same manner by substitution in the process of the appropriate different lower-alkyl starting material. Similarly, where methoxy or other lower-alkoxy group is present, compounds having other lower-alkoxy groups containing various lower-alkyl groups having up to four carbon atoms inclusive are prepared in the same manner from the appropriate different lower-alkoxy starting material. In the same manner, ortho and meta substituted products are produced instead of para by utilizing the selected ortho or meta substituted starting material, and vice versa. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways or modes, for example, orally as in capsules or tablets, or parentially in the form of sterile solutions, suspensions, or by pellet implantation, and in some cases intravenously in the form of sterile solutions. Other modes of administration are cutaneously, subcutaneously, bucally, intramuscularly, and intraperitoneally.

As representative of living animal bodies which may be treated with the compounds and compositions of the invention, and according to the method of treating of the invention, for alleviation of the same and/or similar conditions as those described, in addition to human beings may be mentioned the following. domestic animals such as dogs and cats, farm animals such as horses, cows, sheep, and goats, fur-bearing animals such as mink, seal, muskrat, fox, raccoon, ermine, and weasel, and zoo animals such as bears, antelope, monkeys, baboons, and the like.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 1.0 milligram, may be used in cases of administration to subjects having a relatively low body weight, unit dosages are preferably five milligrams or above and preferably twenty-five, fifty, or one-hundred milligrams, or even higher, depending of course upon the subject treated and the particular result desired, as will be apparent to one skilled in the art. Broader ranges appear to be 0.1 to 500 milligrams per unit dose. The active agents of the invention may be combined for administration with other pharmacologically active agents, such as analgesics, tranquilizers, steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established medical and/or veterinary principles.

Various modifications and equivalents will be apparent to one skilled in the art and may be made in the compounds, compositions and methods of the present invention without departing from the spirit or scope thereof.

What is claimed is:

1. A compound selected from the group consisting of (A) N-(benzoylalkylaminoalkyl)-phenothiazine derivatives of the formula

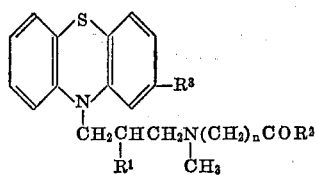

wherein $R^1$ is selected from the group consisting of H and $CH_3$;
$n$ is selected from the group consisting of 1, 2 and 3;
$R^2$ is selected from the group consisting of a phenyl group optionally substituted with not more than three, alike or different, substituents selected from the group consisting of F, Cl, OH, $CF_3$ as well as an alkyl and an alkoxy group containing not more than 4 carbon atoms or a phenyl group substituted at 3,4-positions with an alkylidene dioxy group having one or two carbon atoms in the alkylidene moiety;
$R^3$ is selected from the group consisting of H, F, Cl, $OCH_3$, $CF_3$ or $SO_2N(CH_3)_2$;
and (B) pharmaceutically acceptable acid addition salts thereof.

2. A compound of Claim 1, which is selected from the group consisting of N-methyl-N-(4-chlorobenzoylmethyl)-3-(phenothiazin-10-yl)-propylamine and its pharmaceutically acceptable acid addition salt.

3. A compound of Claim 1, which is selected from the group consisting of N-benzoylmethyl-2,N-dimethyl-3-(2-methoxyphenothiazin - 10 - yl)-propylamine and its pharmaceutically acceptable acid addition salt.

4. A compound of Claim 1, which is selected from the group consisting of N-methyl-N-(4-chlorobenzoylmethyl)-3 - (2 - trifluoromethylphenothiazin-10-yl)-propylamine and its pharmaceutically acceptable acid addition salt.

5. A compound of Claim 1, which is selected from the group consisting of N-methyl-N-(4-chlorobenzoylmethyl)-3 - (2 - chlorophenothiazin-10-yl)-propylamine and its pharmaceutically acceptable acid addition salt.

6. A compound of Claim 1, which is selected from the group consisting of N-methyl-N-(4-chlorobenzoylmethyl)-3 - (2 - methoxyphenothiazin-10-yl)-propylamine and its pharmaceutically acceptable acid addition salt.

References Cited
UNITED STATES PATENTS

| | | | |
|---|---|---|---|
| 3,058,979 | 10/1962 | Ullyot | 260—243 |
| 3,000,886 | 9/1961 | Edgerton et al. | 260—243 |
| 2,890,219 | 6/1959 | Cusic | 260—243 |

HARRY I. MOATZ, Primary Examiner

U.S. Cl. X.R.

424—247